Patented June 10, 1930

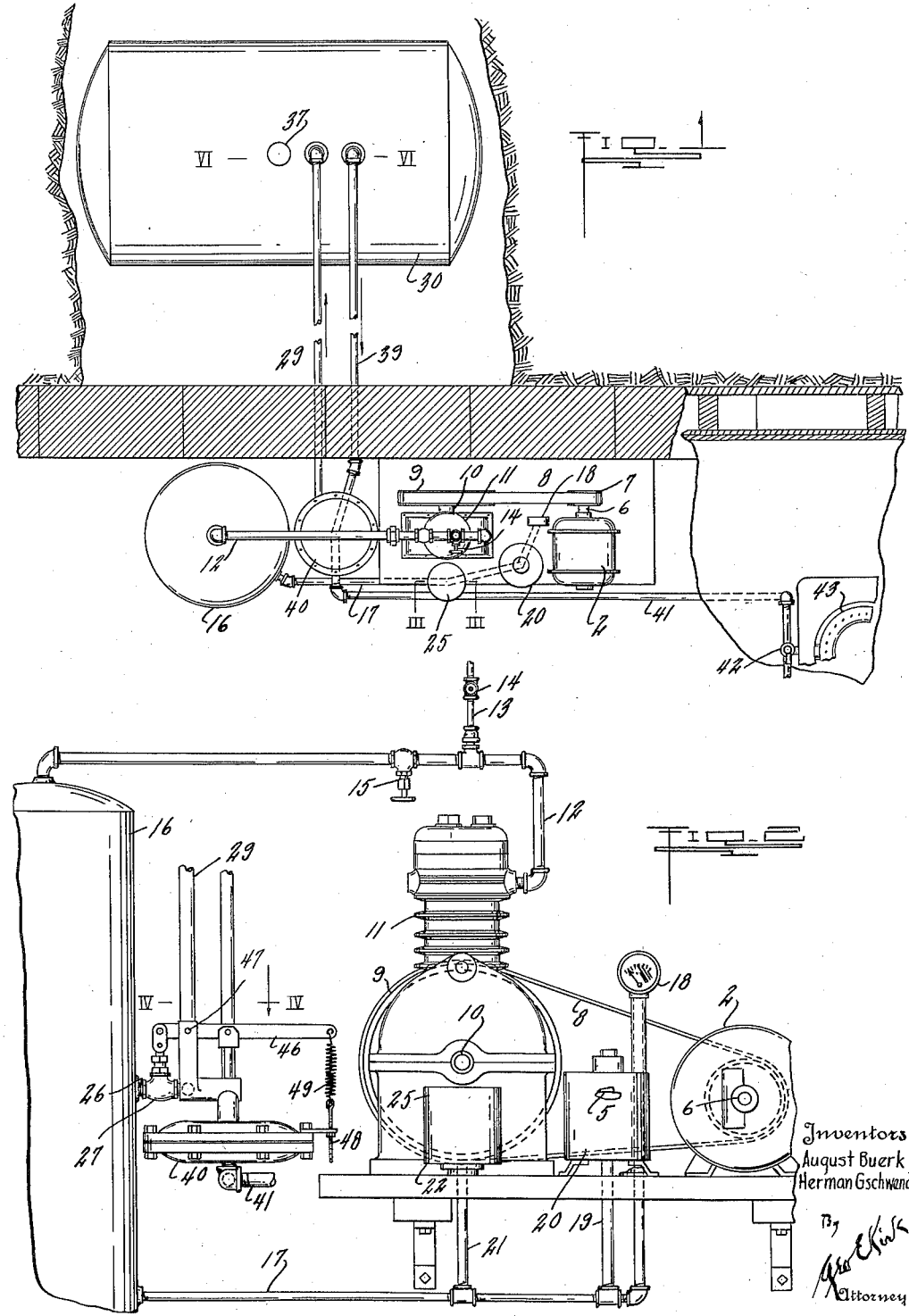

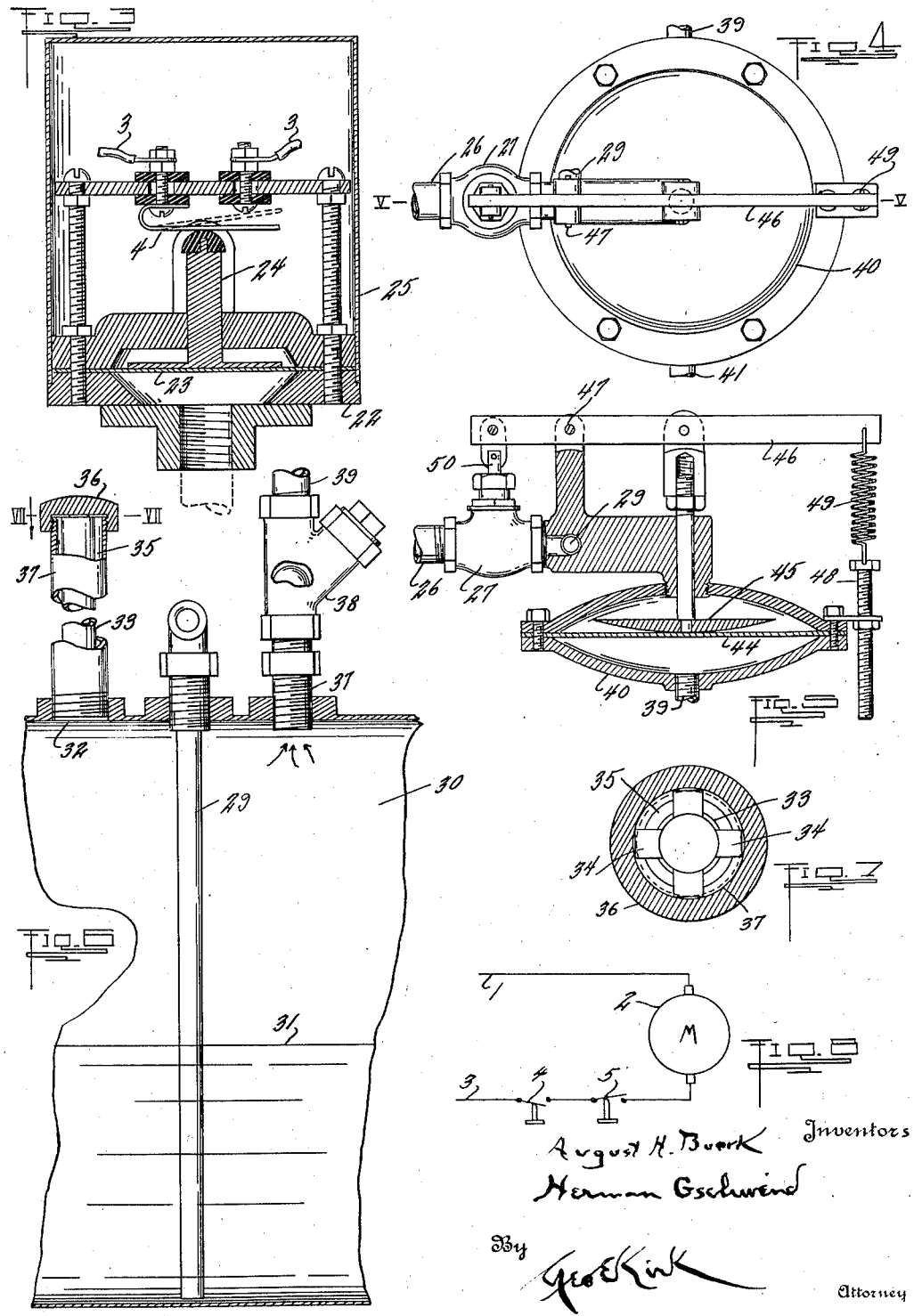

1,763,503

UNITED STATES PATENT OFFICE

AUGUST H. BUERK, OF CURTICE, AND HERMAN GSCHWEND, OF WATERVILLE, OHIO

GAS PLANT

Application filed May 26, 1928. Serial No. 280,940.

This invention relates to apparatus for entraining liquid in a gas.

This invention has utility when incorporated in a fuel generating and delivering installation for carburetion and combustion.

Referring to the drawings:

Fig. 1 is a plan view, with parts broken away, of an embodiment of the invention in a gas generator installation as for suburban and domestic use;

Fig. 2 is a partial side elevation of the apparatus of Fig. 1;

Fig. 3 is a section on the line III—III, Fig. 1;

Fig. 4 is a partial section on the line IV—IV, Fig. 2, looking in the direction of the arrow;

Fig. 5 is a section on the line V—V, Fig. 4;

Fig. 6 is a partial section on the line VI—VI, Fig. 1;

Fig. 7 is a section on the line VII—VII, Fig. 6; and

Fig. 8 is a wiring diagram showing features of control hereunder.

Electric power supply 1 is shown as extending directly to motor 2. Companion electric power supply line 3 is shown as extending past switches 4, 5, to this electric motor 2. The electric motor 2 is shown as having shaft 6 on which is mounted pulley 7 having connection by belt 8 to drive pulley 9 on shaft 10 for operating compressor or pump having cylinder 11 from which extends pressure delivery line 12 as air pressure line having branch 13 controlled by valve 14, so that this pressure air may be used for filling tires, cleaning, or other operations about the household. This line 12, as a pressure line, extends past cut-out valve 15 to air pressure reservoir 16.

From this reservoir 16 extends line 17 to pressure gage 18 indicating the condition of the pressure in this reservoir 16. In the domestic practice hereunder, it is desired to maintain the pressure in this reservoir 16 in the range between five and twenty-five pounds. To this end, line 17 has branch 19 to automatic pressure valve 20 effective to control switch 5 for cutting in or out the power line 3 to the motor 2.

Additionally, this line 17 has branch 21 to housing 22 having diaphragm 23 therein normally holding plunger 24 in position against switch 4. The adjustment of this pressure responsive device is such that as the pressure in the reservoir 16 falls below a pre-determined amount, as three pounds, according to the adjustment of this device, then this plunger 24 drops to open the switch 4. To restart this equipment, it is then necessary to remove cover 25 and hold the switch 4 closed until there is a building up of pressure in the reservoir 16 sufficient to maintain this automatical cut-out switch closed. As the pressure builds up beyond the point adjusted for the operation of this switch 4, as say twenty-five pounds, then the switch 5 is opened. As the pressure in the reservoir 16 falls below five pounds and is above three pounds, then the switch 5 is closed so that the pump or compressor may be operated for recharging the reservoir 16.

From the reservoir 16 extends line 26 to valve 27. This valve 27 as open is in communication by line 29 extending to the lower portion of reservoir 30 below liquid fuel 31 therein. This reservoir 30 is provided with filling opening 32 in which is disposed sleeve 33 as the liquid receiving tube say for gasoline. This inner tube 33 is positioned by wings or spider 34 to leave vent region 35 thereabout thus permitting the charge of this reservoir 31 with the liquid fuel when the valve 27 has been closed. When this desired liquid charge of less than full capacity for the reservoir 30 has been obtained, then cap 36 upon outer tube 37 is effective for simultaneously closing both the filling opening and its adjacent vent.

From this fuel reservoir 30 as adjacent the top thereof, extends carbureted fuel delivery line 37 having therein check valve 38 precluding back flow into the reservoir 30. From this check valve 38 extends delivery line 39 to pressure responsive controller housing 40 and thence by line 41 to pass valve 42 to burner 43, or other places where this gas or liquid fuel may be used as desired, intermittently or continuously.

In this housing 40 is flexible diaphragm 44 acting upon plunger 45 to thrust lever 46 as having fixed fulcrum 47. This thrust of the lever 46 by the plunger 45 is adjusted by screw 48 acting on tension spring 49. In practice, for hot plate or similar type of burner, it is desirable that the pressure acting on the diaphragm 44 be in the range of say two or three ounces and maintained close to such adjusted pressure. Accordingly, when such pressure is but slightly exceeded, the plunger 45 moves upwardly against the action of the spring 49 and rocks the lever 46 to thrust plunger 50 into closing position at the valve 27. As the gaseous fuel is withdrawn from the region of the reservoir 30 above the liquid 31, the pressure drop reacts to permit the spring 49 to depress the plunger 45 thereby opening the valve 27. This means that from the high pressure air tank or reservoir 16, pressure air is delivered through the line 29 below the liquid fuel 31 in the reservoir 30.

This automatic replenishment may occur for a considerable period of time without any necessity for the pump and its drive to be operated, for there is high pressure storage over a considerable range in the reservoir 16. However, as the pressure is depleted below the adjusted amount, the pump will be cut in automatically and build up for considerable pressure thereover, and then automatically cut out through the operation of the valve 20 between its limits. As heretofore pointed out, there is safety precaution against depletion of the pressure permitting no recovery of the apparatus other than resetting of the pressure automatic cutout device at the switch 4.

What is claimed and is desired to secure by United States Letters Patent is:

1. A gaseous fuel installation embodying a delivery line, a liquid fuel reservoir from which the line extends, a pressure responsive controller in said line, a pressure air providing reservoir, a line from the pressure air providing reservoir to below liquid fuel level in the fuel reservoir, and a valve in said latter line operable automatically by said controller.

2. A gaseous fuel installation embodying a delivery line, a liquid fuel reservoir from which the line extends, a pressure responsive controller in said line, a pressure air providing reservoir, a line from the pressure air providing reservoir to below liquid fuel level in the fuel reservoir, a valve in said latter line operable automatically by said controller, a pump for charging the pressure air providing reservoir, a drive for the pump, and an automatic cut-off for the pump independent of the pressure responsive controller.

3. A gaseous fuel installation embodying a delivery line, a liquid fuel reservoir from which the line extends, a pressure responsive controller in said line, a pressure air providing reservoir, a line from the pressure air providing reservoir to below liquid fuel level in the fuel reservoir, a valve in said latter line operable automatically by said controller, a pump for charging the pressure air providing reservoir, a drive for the pump, a control for the drive, and a connection from the pressure air providing reservoir independent of the pressure responsive controller for actuating the drive control.

4. A gaseous fuel installation embodying a delivery line, a liquid fuel reservoir from which the line extends, a pressure responsive controller in said line, a pressure air providing reservoir, a line from the pressure air providing reservoir to below liquid fuel level in the fuel reservoir, a valve in said latter line operable automatically by said controller, a pump for charging the pressure air providing reservoir, a drive for the pump, a control for the drive, a connection from the pressure air providing reservoir independent of the pressure responsive controller for actuating the drive control, and a second automatic control for the drive connected to be operated by pressure drop in the pressure air providing reservoir.

In witness whereof we affix our signatures.

AUGUST H. BUERK.
HERMAN GSCHWEND.